(12) United States Patent
Castellani et al.

(10) Patent No.: US 12,058,283 B2
(45) Date of Patent: Aug. 6, 2024

(54) METHOD AND DEVICE FOR DISPLAYING COMMUNICATION DATA

(71) Applicant: LA TEAM, Valbonne (FR)

(72) Inventors: Emmanuel Castellani, Tourrettes sur Loup (FR); David Miglior, Nice (FR); Michael Miglior, Marseilles (FR); Baptiste Philibert, Grasse (FR); Christophe Meoni, Nice (FR)

(73) Assignee: LA TEAM, Valbonne (FR)

( * ) Notice: Subject to any disclaimer, the term of this patent is extended or adjusted under 35 U.S.C. 154(b) by 449 days.

(21) Appl. No.: 17/297,253

(22) PCT Filed: Nov. 26, 2019

(86) PCT No.: PCT/EP2019/082523
§ 371 (c)(1),
(2) Date: May 26, 2021

(87) PCT Pub. No.: WO2020/109279
PCT Pub. Date: Jun. 4, 2020

(65) Prior Publication Data
US 2022/0030101 A1 Jan. 27, 2022

(30) Foreign Application Priority Data
Nov. 27, 2018 (FR) ...................................... 1871940

(51) Int. Cl.
*H04M 1/72412* (2021.01)
*H04M 1/7243* (2021.01)
(Continued)

(52) U.S. Cl.
CPC ..... *H04M 1/72412* (2021.01); *H04M 1/7243* (2021.01); *H04M 3/02* (2013.01); *H04M 3/42042* (2013.01); *H04M 3/42382* (2013.01)

(58) Field of Classification Search
CPC .......... H04L 65/1094; H04M 1/72412; H04M 1/7243; H04M 3/02; H04M 3/42042; H04M 3/42382
See application file for complete search history.

(56) References Cited

U.S. PATENT DOCUMENTS

2008/0220761 A1* 9/2008 Jang ................... H04M 1/72415
455/420
2014/0181886 A1* 6/2014 Goodman ......... H04M 3/42042
455/415
(Continued)

FOREIGN PATENT DOCUMENTS

EP          2712152 A1    3/2014
FR          3033222 A1    9/2016

OTHER PUBLICATIONS

International Search Report issued in corresponding International Application No. PCT/EP2019/082523, mailed Jan. 30, 2020, pp. 1-2, European Patent Office, Rijswijk, Netherlands.
(Continued)

*Primary Examiner* — Nguyen T Vo
(74) *Attorney, Agent, or Firm* — HAUPTMAN HAM, LLP

(57) ABSTRACT

A method for displaying at least one communication datum on at least one display device disposed in a living space of at least one resident including at least the following steps: receiving by an electronic device a communication datum from a computer server, sending by the electronic device a notification to a control device including a single control button, actuating the single control button, and sending by the control device, a control datum to the electronic device through a wireless communication, sending from the electronic device the first communication datum to the display device, and displaying by said display device said first communication datum.

20 Claims, 3 Drawing Sheets

(51) Int. Cl.
*H04M 3/02* (2006.01)
*H04M 3/42* (2006.01)

(56) References Cited

U.S. PATENT DOCUMENTS

| | | | |
|---|---|---|---|
| 2016/0165026 A1* | 6/2016 | Yang | H04M 1/04 455/557 |
| 2016/0323433 A1* | 11/2016 | Anderson | H04W 48/04 |
| 2020/0145602 A1* | 5/2020 | Lee | H04M 1/72412 |
| 2022/0021924 A1* | 1/2022 | Matsubara | H04H 60/80 |

OTHER PUBLICATIONS

Written Opinion issued in corresponding International Application No. PCT/EP2019/082523, mailed Jan. 30, 2020, pp. 1-6, European Patent Office, Rijswijk, Netherlands.

* cited by examiner

[Fig. 1]
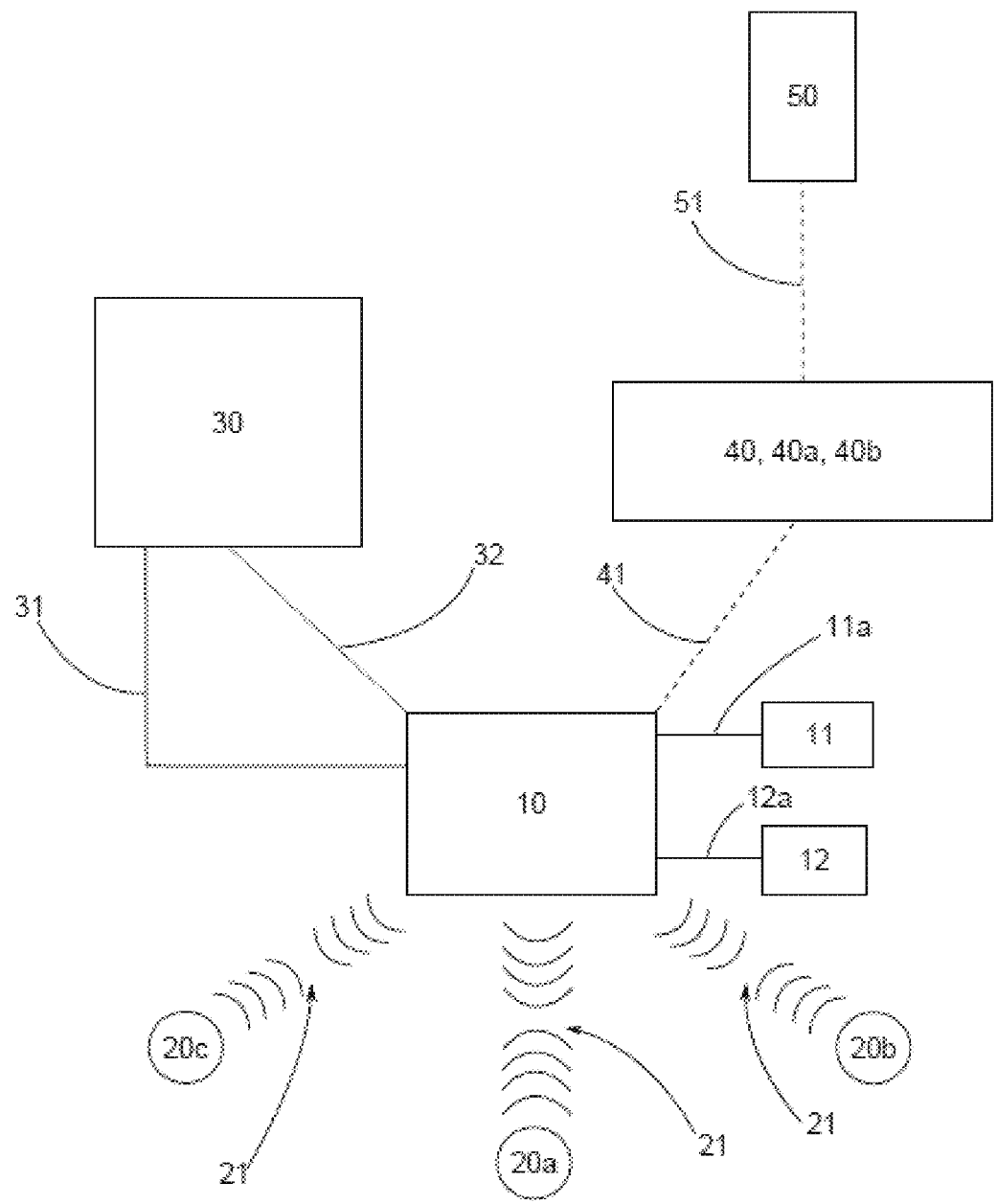

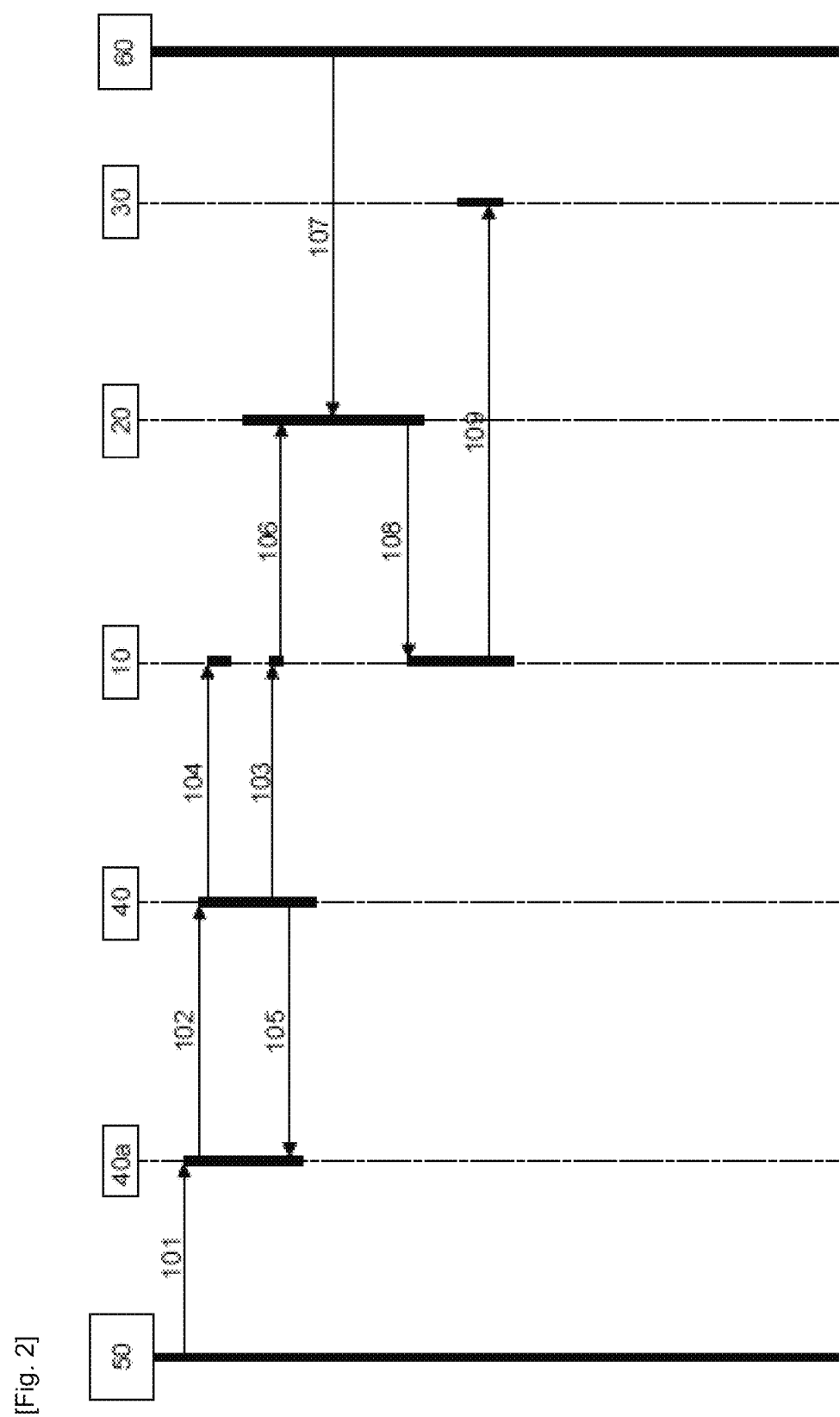

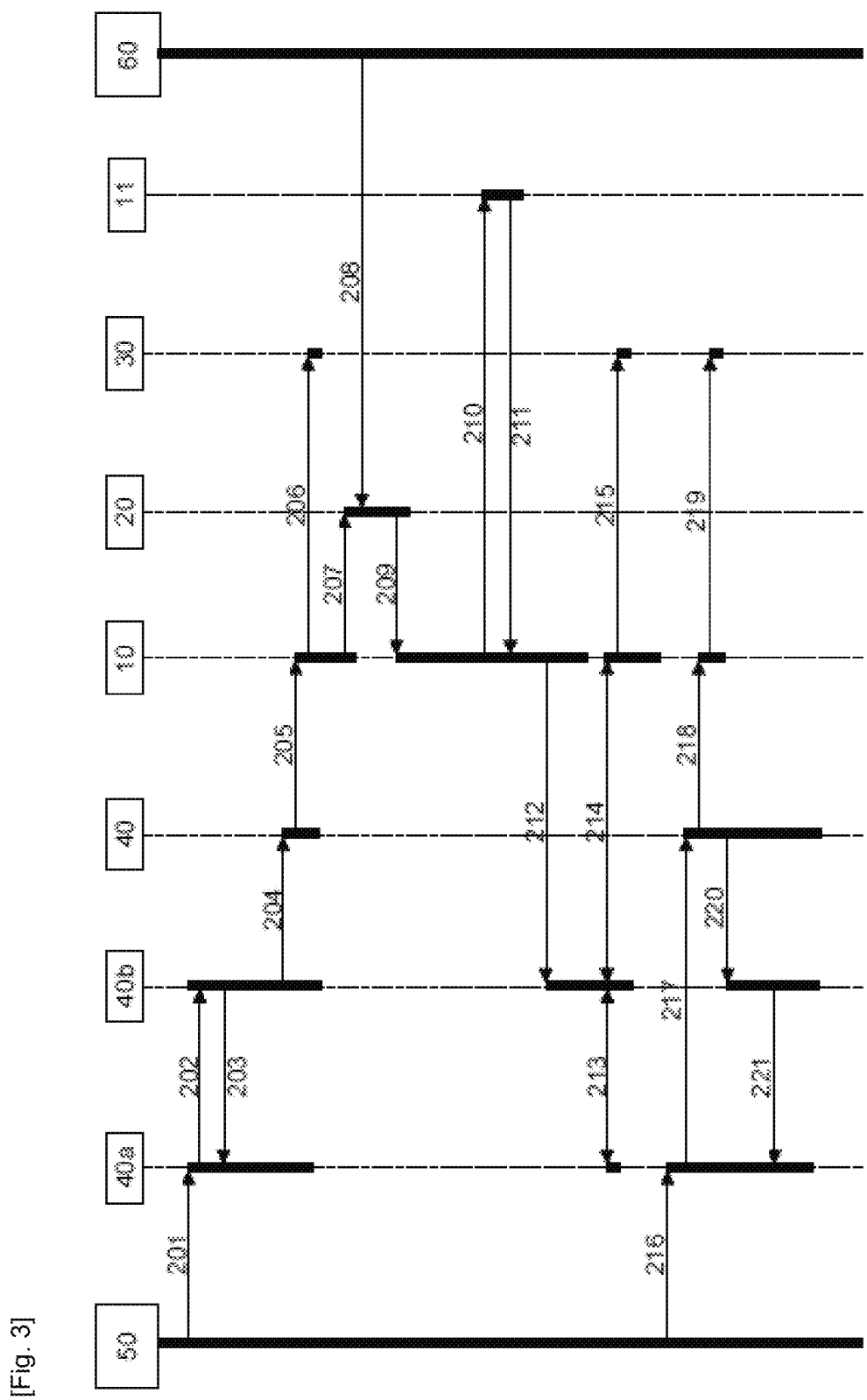
[Fig. 3]

METHOD AND DEVICE FOR DISPLAYING COMMUNICATION DATA

The present application is a U.S. National Phase of International Application Number PCT/EP2019/082523, filed Nov. 26, 2019, which claims priority to French Application No. 1871940, filed Nov. 27, 2018.

TECHNICAL FIELD

The present invention relates to the field of telecommunications in general, and more particularly to establishing connection between an elderly person and his relatives.

PRIOR ART

While the world has never known in its history so many means of communication, there is a group of the population which has great difficulties in using these new technologies.

Indeed, the elderly suffer from not being able to master these technologies and therefore often find themselves cut off from the world and even more seriously from their loved ones.

Solutions have been tried. For example, mobile phones called simplified mobile phones with large buttons are intended for seniors. However, this type of telephone remains difficult to master and above all does not, for example, allow audiovisual communication to be established. And when it comes to reading or sending text messages, that is almost impossible given the small screen size.

Assistance is therefore necessary to allow, for example, the establishment of audiovisual communication with relatives.

The problem is the same with social networks and photos that relatives can post but that seniors cannot easily consult.

There is therefore a real problem of accessibility to telecommunication technologies for the elderly.

The present invention aims at resolving at least in part the problems set out above.

SUMMARY

The present invention relates to a method for displaying at least one communication datum on at least one display device, such as a television set, disposed in a living space of at least one resident, said communication datum being taken from at least: a text, an image, an audio and/or video data stream, an audio and/or video call request, an audio and/or video recording, said display method comprising at least the following steps:
  Receiving by an electronic device, located in said living space, at least a first communication datum from at least one computer server in communication with the electronic device through at least one communication network;
  Sending by the electronic device at least one notification to at least one control device comprising a single control button;
  Receiving said notification by said control device;
  Then, generating by said control device at least one notification intended for said resident, said notification being taken from at least: a visual notification, an auditory notification, a tactile notification;
  In response to said notification, actuating the single control button of the control device by at least one finger of the resident, and
  In response to said actuation, sending by the control device a control datum to the electronic device through a wireless communication;
  Receiving by the electronic device said control datum from the control device;
  Sending from the electronic device the first communication datum to the display device;
  Displaying by said display device said first communication datum.

The present invention allows a resident of a retirement home for example, or more generally an elderly person, to receive news from his relatives directly on his television simply by actuating a control button.

Indeed, the present invention simplifies the connection between an elderly person and his relatives. It allows to send photos or text messages directly to the elderly person who will then see the photos or text messages on their television screen.

Very advantageously, audiovisual communication can be established between the resident and his relatives by simple actuation by the resident of a control device, for example, by touching or pressing it.

The resident does not need any particular knowledge or mastery of new technologies, he just needs to know how to press or know how to touch a control device in order to accept a communication, to receive a message or a photo, or even to request a communication with his relatives.

The present invention simplifies technology to enable our seniors to stay closer to us.

The present invention also relates to a system implementing such a method.

The present invention also relates to a system for displaying at least one communication datum on at least one display device configured to display said communication datum and being disposed in a living space of at least one resident comprising at least one electronic device and at least one control device, the electronic device and the control device being configured to perform at least some of the steps of the display method according to the present invention.

The present invention also relates to a system for displaying at least one communication datum on at least one display device configured to display said communication datum and being disposed in a living space of at least one resident comprising at least:
  One electronic device being configured for:
    receiving at least said communication datum from at least one computer server,
    sending at least said communication datum, and preferably at least one display instruction, to said display device;
    sending at least one notification to at least one control device;
    receiving at least one control datum from at least one control device;
  Said control device comprising a single control button and being configured for:
    receiving at least said notification from said electronic device;
    generating at least one notification taken from at least: a visual notification, an auditory notification, a tactile notification;
    emitting said control datum to said electronic device by means of a wireless communication by actuating said control button by at least one finger of a resident.

The present invention uses technology to simplify its use with the elderly. Thus, the present invention simply allows an elderly person to communicate with his relatives by means of his television.

The present invention simplifies the interaction of the elderly person with telecommunication technologies by simply asking them to actuate a control button in order to receive news from their family, or even give news to them.

The present invention also relates to a computer program product, preferably stored on a non-transient medium, comprising instructions, which when executed by at least one microprocessor, perform the steps of the method according to the present invention.

The other objects, features and advantages of the present invention will become apparent upon examining the following description and the accompanying drawings. It is understood that other advantages can be incorporated.

BRIEF DESCRIPTION OF THE FIGURES

The purposes, objects, as well as the features and advantages of the invention will become more apparent from the detailed description of an embodiment thereof which is illustrated by the following accompanying drawings wherein:

FIG. 1 illustrates a system according to one embodiment of the present invention FIG. 2 illustrates a method for displaying at least one communication datum according to one embodiment of the present invention.

FIG. 3 illustrates a method for displaying at least one communication datum according to another embodiment which is perfectly compatible with the embodiment of FIG. 2.

The appended drawings are given by way of example and are not limiting of the invention. These drawings are schematic representations and are not necessarily to the scale of practical application.

DETAILED DESCRIPTION

Before starting a detailed review of embodiments of the invention, optional features are listed below which may optionally be used in combination or alternatively:

Advantageously, the present invention comprises at least one step of sending, from the electronic device to the display device, at least one instruction to switch from a first video source to a second video source, before and/or after receiving the control datum by the electronic device from the control device. This allows the communication datum to be displayed on the television of a resident without the resident having to manually switch from one video source to another.

Advantageously, the present invention comprises at least one step of storing the first communication datum in at least one non-transient storage module of said electronic device, before and/or after the step of sending the notification, by the electronic device, to the control device. This allows to view the communication datum later, for example if the resident wishes to review it or if he is not available when the electronic device receives this communication datum.

Advantageously, the present invention comprises, after the step of receiving, by the electronic device, the control datum from said control device, at least the following steps:

Sending by said electronic device to at least one computer server at least a first audio and/or video data stream;

Receiving by the electronic device at least a second audio and/or video data stream from a computer server, the second audio and/or video data stream coming from at least one user terminal. This allows to establish a videoconference between the resident and his relative(s).

Advantageously, the present invention comprises, before the step of sending at least a first audio and/or video data stream by said electronic device to at least one computer server, at least the following steps:

Sending from the electronic device at least one instruction to activate at least one audio capture module and/or at least one video capture module respectively to at least one audio capture module and/or to at least one video capture module;

Receiving by the audio capture module and/or the video capture module the activation instruction from the electronic device;

Activating the audio capture module and/or the video capture module;

Sending by the audio capture module and/or by the video capture module the first audio and/or video data stream to the electronic device;

Receiving by the electronic device the first audio and/or video data stream from the audio capture module and/or the video capture module respectively;

Advantageously, the present invention comprises, before the step of sending at least a first audio and/or video data stream by said electronic device to at least one computer server, at least the following steps:

Sending from the electronic device at least one instruction to activate at least one capture module to at least one capture module, the capture module being taken from at least one audio capture module and/or one video capture module;

Receiving by the capture module the activation instruction from the electronic device;

Activating the capture module;

Sending by the capture module the first audio and/or video data stream to the electronic device;

Receiving by the electronic device the first audio and/or video data stream from the capture module.

Advantageously, the present invention comprises, before and/or after sending from the electronic device the first communication datum to the display device, at least one step of sending from the electronic device to the display device at least one instruction to display the communication datum.

Advantageously, sending from the electronic device at least one instruction to display the communication datum to the display device is carried out through at least one optical connection between the electronic device and the display device, preferably by sending at least one infrared signal from the electronic device to the display device.

Advantageously, the present invention comprises, before the step of receiving by the electronic device at least a first communication datum from at least one computer server, the following steps:

Actuating said single control button by at least one finger of said resident;

In response to said actuation, sending by said control device a preliminary control datum to the electronic device;

Receiving by said electronic device at least one preliminary control datum from said control device;

Sending by the electronic device at least one preliminary communication datum to at least one computer server;

Receiving by the computer server said preliminary communication datum from the electronic device;

Sending by the computer server said preliminary communication datum to at least one user terminal. This allows the resident to send a videoconference request to one of his relatives.

Advantageously, the preliminary communication datum comprises an audio and/or video call request.

Advantageously, the first communication datum is taken from: a text, an image, an audio and/or video data stream, an audio and/or video call request.

Advantageously, the single control button is a push button and/or a touch sensor, such as for example a physical contact detector. This makes it very easy to actuate the control device.

Advantageously, the control device is configured to be worn by the resident, preferably in the shape of a pin, badge or bracelet. This allows the resident to keep the control device with him and thus be able to actuate it upon reception of a notification or at his convenience.

Advantageously, the control device is shaped to fit in the hand of a resident. This allows to make the control device ergonomic.

Advantageously, the control device comprises an electrical power source. This allows the control device to be mobile with the resident.

Advantageously, the electronic device controls the display device by means of an optical and/or electrical connection. This allows, for example, to adjust the volume of the television or to switch the video source while transmitting the communication datum to be displayed.

Advantageously, the electronic device controls the display device by means of an electrical connection.

Advantageously, the electronic device controls the display device by means of an optical connection.

Advantageously, the display device comprises at least one audio and/or video input configured to receive at least one audio and/or video data stream and at least one optical, preferably infrared communication port, configured to receive at least one instruction from at least one remote control different from the electronic device and from the control device, the electronic device being configured to control the display device by sending at least one optical signal comprising at least one instruction to said optical communication port. This allows to control the television set directly via its infrared port. The television set thus receives infrared control signals corresponding to those of a remote control but coming from the electronic device.

Advantageously, the present invention comprises a plurality of control devices distinct from each other, physically separate and configured to emit single control data different from each other to the electronic device. This allows to have a plurality of control devices, each control device being able, for example, to be assigned to a particular contact among the relatives of the resident.

Advantageously, the electronic device is intended to be in communication with at least one audio capture module and/or one video capture module. This allows to connect a microphone and/or a camera to the electronic device so as to allow audio and/or visual communication between the resident and his relatives.

Advantageously, the electronic device comprises at least one processor, at least one non-transient memory storing a computer program product including instructions that can be executed by said at least one processor, said instructions being configured to at least partly execute the method according to the present invention.

In general, the field of application of the present invention is to establish connection between a person requiring assistance, whether this assistance is physical or mental or any other assistance, and his relatives. Thus, even though in the following description, it will mainly be referred to the elderly, this will be only by way of example and in no way limiting. For example, the present invention could find an application in nurseries for children as well as in institutes specialising in certain mental disorders.

The present invention finds as a preferred field of application the connection between a resident of a retirement home, preferably of Establishment Hosting for the Dependant Elderly (care home), and his relatives.

Indeed, many elderly people find themselves cut off from their loved ones when they enter this type of establishment, because today, where communication is easier than ever, this technology eludes the elderly.

As will be described below, the present invention proposes to provide a reliable, simple and ergonomic solution to allow contact between the elderly and their relatives in the very broad sense of the term.

In a simple manner, the elderly can, by means of the present invention, receive photos, text messages and audio and/or video calls directly on their television screen without more difficulty than pressing a single button.

Indeed, in a very clever way, the present invention allows relatives to send photos or text messages and even calls to their parents, grandparents or great-grandparents placed in nursing, retirement or care homes. This communication can be established by means of a mobile terminal of the smartphone type, for example, but also from a computer. This communication will then be received by the resident on a screen such as his television for example.

Note that a living space can for example be a bedroom or a room in a building.

Thus the present invention is configured so as to be able to be implemented in the room of a resident which would comprise a television and a connection to the Internet for example or more generally to a communication network of the wide area communication network type.

According to one embodiment, the present invention will now be described through FIGS. 1 to 3.

FIG. 1 schematically shows a system according to one embodiment of the present invention.

The communication datum display system according to the present invention comprises at least:

An electronic device 10

Advantageously, an audio capture module 11 and/or a video capture module 12

A display device 30

A control device 20

Preferably, a computer server 40, 40a, 40b

Preferably, a user terminal 50

According to one embodiment, the electronic device 10 comprises at least one microprocessor, at least one non-transient storage module comprising at least a series of instructions intended to be implemented by said microprocessor.

Advantageously, this electronic device 10 can be installed in a display device 30, in a television for example, or can be installed in a box located for example near the display device 30. For example, the electronic device 10 can be disposed in a box located near the television 30 of the resident 60 directly in his room.

Preferably, the electronic device 10 is connected to a communication network of the Internet type, for example. This communication 41 can be wired and/or wireless. The electronic device 10 advantageously comprises a communication module intended to allow communication between the electronic device 10 and at least a plurality of other devices taken from at least the display device 30, the control device 20, the computer server 40, 40a, 40b.

The electronic device 10 is preferably connected by a wired connection 31 to the display device 30, for example by means of an HDMI (from "High-Definition MultiMedia Interface") type video connection for example. This connection 31 then allows the electronic device 10 to send communication data to the display device 30 so that they are displayed by the display device 30.

Advantageously, this connection 31 can also allow the sending of instructions for controlling the display device 30, such as, for example, instructions for switching between several video sources, or else sound control instructions in a non-limiting manner.

According to one embodiment, the electronic device 10 is in optical communication 32 with the display device 30. For example, the electronic device 10 can comprise an infrared module intended to transmit control instructions from the electronic device 10 to the display device 30, in particular to the infrared receiver of the display device 30. Advantageously, this allows to use the present invention with a television 30 not comprising an electrical control port such as an HDMI port for example. Indeed, on older televisions 30, the audio/video input is generally a scart socket, which does not allow control instructions to be received, for example. Also, the use of infrared communication from the electronic device 10 to the television set 30 allows to control the television set from the electronic device as if the television set 30 were controlled by a remote control.

More generally, the electronic device 10 can be in communication 31, 32 with the display device 30 through any type of communication allowing the transfer of communication data and/or control instructions.

The electronic device 10 also comprises a wireless connection 21 with at least one control device 20 and preferably with a plurality of control devices 20a, 20b, 20c. This wireless connection 21 thus allows the electronic device 10 to transmit to the control device 20 at least one notification, for example of arrival of at least one new communication datum.

This wireless connection 21 also allows the transmission from the control device 20 to the electronic device 10 of at least one control datum. Indeed, as described below, the resident 60 can send a control datum to the electronic device 10 by actuating the single control button that the control device 20 comprises.

Advantageously, the electronic device 10 is in wired and/or wireless communication 11a, 12a with at least one audio capture module 11 and/or one video capture module 12. For example, the electronic device 10 can be connected to a microphone 11 and/or a camera 12.

According to one embodiment, the video capture module 12 can comprise the audio capture module 11. Preferably, the camera 12 can be connected by a wired connection of the USB type to the electronic device 10.

According to another embodiment, the camera 12 can be a wireless camera connected by means of a wireless connection 12a, of the radio frequency type for example, with the electronic device 10.

According to one embodiment, the microphone 11 can be connected to the electronic device 10 in a wireless manner so as to allow the resident 60 to wear on him or to have the microphone 11 close to his position.

According to one embodiment, the electronic device 10 comprises at least:
A non-transient storage module;
A communication module with at least one Internet-type communication network;
A wireless communication module configured to communicate with at least one control device 20, 20a, 20b, 20c;
A display device 30 control module comprising an optical, preferably infrared communication sub-module;
A video emission module configured to transmit at least one communication datum to the display device 30 to display said communication datum.

According to one embodiment, the electronic device 10 is configured for at least one of the following functions and actions, preferably for all the following functions and actions:
Being in communication with at least one computer server 40, 40a, 40b through at least one communication network, for example Internet;
Receiving at least one communication datum from at least one computer server 40, 40a, 40b;
Receiving at least one notification from at least one computer server 40, 40a, 40b;
Sending at least one audio and/or video data stream to at least one computer server 40, 40a, 40b;
Being in wired and/or wireless communication with the audio capture module 11 and/or the video capture module 12;
Sending at least one instruction to activate the audio capture module 11 and/or the video capture module 12;
Receiving at least one audio and/or video data stream from the audio capture module 11 and/or the video capture module 12, respectively;
Being in wired and/or wireless communication with the display device 30;
Sending to the display device 30 at least one instruction to switch from a first video source to a second video source;
Sending at least one instruction to display at least one communication datum to the display device 30;
Sending at least one communication datum to the display device 30;
Sending at least one instruction to display at least one audio and/or video data stream to the display device 30;
Sending to the display device 30 at least one instruction to switch from a second video source to a first video source;
Sending at least one control instruction to the display device 30;
Being in wireless communication with at least one control device 20, preferably with a plurality of control devices 20a, 20b, 20c;
Sending at least one notification to the control device 20, preferably to at least one control device 20a, 20b, 20c from the plurality of control devices 20a, 20b, 20c;

Receiving at least one control datum from the control device 20, preferably from at least one control device 20a, 20b, 20c from the plurality of control devices 20a, 20b, 20c.

The control device 20, according to one embodiment, may be in the shape of a roller, a small cylinder or any other ergonomic shape to be held in the hand of the resident 60.

Advantageously, the control device 20 has a main extension dimension less than or equal to 10 cm, preferably 5 cm and advantageously 2 cm.

According to one embodiment, the control device 20 comprises:
A single control button;
At least one power source;
At least one wireless communication module, for example by optical type or preferably radiofrequency type connection;
At least one notification generation module.

The control device 20, according to one embodiment, is configured to be very easy to use. Indeed, the control device 20 comprises only one control button. This control button may for example be a push button, or else a touch sensor, or else any type of switch allowing it to be actuated by the resident 60.

Advantageously, the single control button is configured so that it can only be in two distinct states, an on state and an off state. Thus, the operation of the single button is simple, it is of binary type. The single control button is configured to be easily actuated by the resident 60 by simply touching and/or pressing the single control button.

According to one embodiment, the notification generation module is configured to generate at least one notification taken from:
Visual notification;
Auditory notification;
A tactile notification.

A visual notification can for example correspond to the generation of a light by the notification generation module, for example by means of a light source such as one or more light emitting diodes.

According to one embodiment, this light can have a colour related to a certain type of notifications. For example, in the case of a notification of a new text message, the light could be a first colour. In the case of a notification of a new photo, the light could be a second colour, and in the case of an audio and/or video call notification, the light could be a third colour, the first colour, the second colour and the third colour being different from each other for example.

Many variants are possible wherein the light has a dynamic, for example the control device 20 could flash to signal a missed call or else text, audio and/or video messages or photos are to be viewed.

Likewise, it is possible to assign a light animation as well as one or more colours to each registered contact in order to allow visual identification of callers by the resident 60.

This plurality and this notification light dynamic also apply to the case of sound or touch notifications.

Indeed, according to one embodiment, the control device 20 can vibrate upon receiving a notification, and for example according to a particular animation like the light notification.

According to another embodiment, the notification can be audible and thus a sound can be assigned to each type of notifications and/or contacts.

According to one embodiment, the resident 60 can by pressing or touching the single control button transmit a call control datum from one or more pre-registered contacts.

For example, a single press of a single control button allows to send an audio and/or video call request to a first contact, while two repeated presses correspond to a second contact, and so on.

According to another embodiment, pressure sequences can be pre-registered in order to perform various actions with the control device 20 and to easily control the electronic device 10.

According to yet another embodiment, the system comprises a plurality of control devices 20. This allows for example to have control devices 20 in several places of the room or of the living area of the resident 60 so as to allow him to use the present display system easily and without having to move much.

This also allows, for example, to assign a control device 20 to each pre-registered contact at the system so as to allow the resident 60 to easily contact the person he wishes from these pre-registered contacts. Advantageously, an illustration or a photo of the contacts can be associated with each control device 20, 20a, 20b, 20c. Thus, the face of the son of a resident 60 can be displayed on a control device 20 so that the actuation of the single button of this particular control device 20 allows the sending of a control datum to the electronic device 10 configured to establish a communication between the resident 60 and his son.

According to one embodiment, the control device 20 is configured for at least one of the following functions and actions, preferably for all of the following functions and actions:
Being in wireless communication at least one electronic device 10 as described above;
Receiving at least one notification from the electronic device 10;
Generating at least one notification taken from at least one: visual, auditory or even tactile notification.
Sending at least one control datum to the electronic device 10;
Being actuated by actuation of the single control button by the resident, for example by a resident's finger 60.
According to one embodiment, the display device 30 comprises a television type screen for example. The display device 30 is configured for at least one of the following functions and actions, preferably for all the following functions and actions:
Displaying at least one communication datum;
Being in communication with the electronic device 10 in a wired and/or wireless manner;
Receiving at least one communication datum from the electronic device 10, preferably by means of a wired connection 31;
Receiving at least one control instruction from the electronic device 10, preferably by means of a wireless, for example optical, preferably infrared connection 32.

According to one embodiment, the display device is a television set, also called a television. This is advantageous because the present invention can be directly implemented without difficulty in the living space of a resident. Indeed, the present invention is configured to be connected to a television and to an Internet type communication network. Thus, the present invention can be implemented simply in any living space comprising a television and a connection to the Internet or to another communication network in communication with at least one computer server.

According to one embodiment, the computer server 40, 40a, 40b can comprise or be in communication with:
At least one computer portal 40a;
At least one computer platform 40b.

The computer server 40, 40a, 40b is in wired and/or wireless communication with at least one user terminal 50 and/or with the electronic device 10.

According to one embodiment, the computer portal 40a can be an application hosted by a computer server, commonly called a web application for example. According to another embodiment, the computer portal can be a mobile application installed totally or partially on the user terminal 50 for example.

According to one embodiment, the computer platform 40b can be an application hosted by a computer server.

Preferably, the computer server 40, 40a, 40b is said to be remote relative to the electronic device 10, that is to say that the computer server 40, 40a, 40b can be located in another room, another city, another country than the one where the electronic device is located 10.

According to one embodiment, the computer server 40, 40a, 40b is configured for at least one of the following functions and actions, preferably for all the following functions and actions:

- Being in wired and/or wireless communication with at least one computer portal 40a;
- Receiving at least one communication datum from the computer portal 40a;
- Sending at least one notification of reception of new communication datum to the computer portal 40a;
- Receiving at least one interrupt instruction from the computer portal 40a;
- Being in wired and/or wireless communication with at least one computer platform 40b;
- Receiving at least one connection request from the computer platform 40b;
- Sending at least one instruction to close at least one communication channel to the computer platform 40b;
- Being in wired and/or wireless communication with at least one electronic device 10;
- Sending at least one communication datum to the electronic device 10;
- Sending at least one notification to the electronic device 10;
- Sending at least one interrupt notification to the electronic device 10;

FIG. 2 shows a method for displaying at least one communication datum on the display device 30 of a resident 60, for example a great-grandmother 60. This communication datum can come from a terminal user 50 of a relative, for example from the smartphone 50 of her great-granddaughter.

A communication datum can for example and in a non-limiting manner, be a text, a photo, a video and/or sound recording and finally an audio and/or video call.

According to FIG. 2, and the embodiment shown therein, the great-granddaughter transmits a communication datum, for example a photo, to her great-grandmother 60.

Indeed, the present invention allows to display on the television 30 of the great-grandmother 60, for example, a photo that her great-granddaughter sent to her from her smartphone 50.

As described below, the photo taken by the great-granddaughter's smartphone 50 is sent to at least one computer portal 40a. Then, from the computer portal 40a, the photo is sent to at least one computer server 40. Then, from the computer server 40, the photo is sent to the electronic device 10.

Preferably, upon reception by the electronic device 10, the photo is recorded in at least one storage module. Then, the photo is advantageously integrated into at least one animation comprising, for example, one or more other photos or text messages.

Preferably, the computer server 40 transmits a new message notification to the electronic device 10.

Advantageously, the electronic device 10 transmits to the control device 20 a notification. Upon reception of this notification, the control device 20 can for example vibrate or else emit a light. This light may be characteristic of receiving a photo and/or communication datum from the great-granddaughter.

Advantageously, the control device 20 can be worn by the resident 60, thus it can be a brooch, a badge, a necklace or else a bracelet.

Thus, when the great-grandmother 60 sees, for example, her badge light up or vibrate, she presses or simply touches the single control button of the control device 20.

When the single control button is actuated, the control device 20 sends a control datum to the electronic device 10, which then sends the photo to the display device 30 and preferably controls the display device 30 so that the latter displays the photo. Thus, the great-grandmother 60 can see the photo her great-granddaughter sent her.

Thus according to one embodiment of the present invention, the method for displaying at least one communication datum comprises at least some and preferably all the following steps. It can also comprise additional steps:

- Sending 101 from the user terminal 50 at least a first communication datum to at least one computer server 40, 40a, 40b, preferably to a computer portal 40a hosted in at least a first computer server 40;
- Receiving by the computer portal 40a at least said communication datum from the user terminal 50;
- Sending 102 from the computer portal 40a the first communication datum to at least one computer server 40, 40b;
- Receiving by said computer server 40, 40b the first communication datum from the computer portal 40a;
- Preferably, sending from said computer server 40, 40b at least one notification of new communication datum to the electronic device 10;
- Receiving 104 by the electronic device 10 the notification of a new communication datum from said computer server 40, 40b;
- Sending from said computer server 40, 40b the first communication datum to the electronic device 10;
- Receiving 103 by the electronic device 10 the first communication datum from said computer server 40, 40b;
- Storing the first communication datum in at least one storage module of the electronic device 10;
- Preferably, adding said communication datum in a visual animation being displayed by the display device 30 and comprising a plurality of communication data;
- Sending 105 from said computer server 40, 40b a notification of reception of a new communication datum to the computer portal 40a;
- Receiving by the computer portal 40a the notification of reception of a new communication datum from the computer server 40, 40b;
- Sending 106 from the electronic device 10 a notification to the control device 20;
- Receiving by the control device 20 the notification from the electronic device 10;
- Generating at least one notification by the control device 20;

Actuating 107 by the resident 60, preferably by the resident's finger 60, the single control button of the control device 20;

Sending from the control device 20 a control datum to the electronic device 30;

Receiving 108 by the electronic device 10 the control datum from the control device 20;

Sending 109 from the electronic device 10 the first communication datum to the display device 30 and sending at least one instruction to switch from a first video source to a second video source to the display device 30, and preferably sending from the electronic device 10 at least one instruction to display the communication datum to the display device 30.

Receiving by the display device 30 the switching instruction from the electronic device 10;

Switching by the display device 30 from the first video source to the second video source;

Receiving by the display device 30 the communication datum from the electronic device 10, preferably through the second video source;

Displaying by the display device 30 said communication datum.

According to one embodiment, the computer server 40, 40a, 40b can listen to come social networks on the Internet so that when a pre-registered keyword is detected in one or more social networks, the message associated with this keyword is transmitted directly to the electronic device 10 in the form of communication datum. This allows, for example, a relative to post a photo on a social network by assigning a keyword thereto, and thus automatically the resident 60 can receive this photo on his television 30.

The present invention allows a resident 60 of a retirement home, for example, to view photos, text messages and other messages sent from his relatives directly on his television 30, in a simple manner.

According to one embodiment, FIG. 3 shows a method for displaying at least one communication datum on the display device 30 of a resident 60. According to this embodiment, the communication datum is an audio and/or video data stream. Indeed, FIG. 3 schematically shows a method for setting up an audio and/or visual communication between a resident 60 such as a grandfather with, for example, his grandson.

According to FIG. 3, and the embodiment shown therein, the grandson calls his grandfather 60 from, for example, his computer 50 in order to carry out a videoconference with his grandfather 60.

Indeed, the present invention allows the audiovisual connection through the television 30 of the grandfather 60 between the latter and his grandson.

As described below, the connection request for the grandson is sent to at least one computer portal 40a. Then, from the computer portal 40a, this connection request is sent to at least one computer platform 40b. The computer platform 40b is configured to then create at least one communication channel intended to allow the transit of audio and/or video data streams between the grandfather 60 and his grandson.

Then, preferably once the communication channel has been created, the computer platform 40b sends the connection request to at least one computer server 40. This computer server 40 then transmits this connection request to the electronic device 10.

Once received, the electronic device 10 sends a notification to the control device 20 as well as at least one instruction to the television 30 in order to prepare for the videoconference.

Once the grandfather 60 actuates the single control button, for example by pressing it or simply by touching it, the electronic device 10 sends at least one instruction to activate a microphone 11 and/or a camera 12. Said module(s) then transmit one or more data streams to the electronic device 10 which transmits it or them to the computer platform 40b. The latter then transmits it or them to the grandson's computer 50, for example through the computer portal 40a. Thus, the grandson can hear and/or see his grandfather 60, and his grandfather 60 can also hear and/or see him through the microphone and/or the camera of the grandson's computer 50.

According to one embodiment, the grandfather 60 can also initiate the call to his grandson, for example by pressing or touching the single control button of a control device 20 which is either pre-registered to correspond with his grandson, or through an activation sequence corresponding to his grandson. Thus this allows the grandfather 60 to enter into audio and/or visual communication with his grandson, or more generally with any pre-registered relative.

According to one embodiment, the system according to the present invention comprises a plurality of control devices 20a, 20b, 20c, each device corresponding to a pre-registered contact for example.

Finally, in order to end the communication, the grandson or the grandfather 60 can interrupt the communication. Preferably only the grandson can interrupt it so that the resident 60 has to perform as few actions as possible, that is to say only actuate the control device 20 via the single control button.

Thus according to another embodiment, the method for displaying at least one communication datum comprises at least some and preferably all the following steps. It can also comprise additional steps:

Sending 201 from a user terminal 50 at least one communication request to a computer server 40, 40a, 40b, preferably to a computer portal 40a hosted in at least one computer server 40, 40b;

Sending 202 from the computer portal 40a said communication request to a computer platform 40b;

Creating 203 at the computer platform 40b a communication line;

Sending 204 from the computer platform 40b a notification of creation of said communication line to the computer server 40;

Sending from the computer server 40 the connection request to the electronic device 10;

Receiving 205 by the electronic device 10 the communication request from the computer server 40;

Sending 206 from the electronic device 10 at least one control instruction to the display device 30 configured for the display device 30 to switch from a first video source to a second video source;

Sending 207 by the electronic device 10 at least one notification to the control device 20;

Receiving by the control device 20 said notification from the electronic device 10;

Generating by the control device 20 at least one notification taken from at least one visual, auditory or tactile notification;

Actuating 208 by the resident 60 the single control button of the control device 20;

Sending by the control device 20 at least one control datum to the electronic device 10;

Receiving 209 by the electronic device 10 the control datum from the control device 20;

Sending 210 from the electronic device 10 at least one instruction to activate the audio capture module 11 and/or the video capture module 12 respectively to the audio capture module 11 and/or to the video capture module 12;

Receiving by the audio capture module 11 and/or the video capture module 12 the activation instruction from the electronic device 10;

Activating the audio capture module 11 and/or the video capture module 12;

Sending by the audio capture module 11 and/or by the video capture module 12 at least a first audio and/or video data stream to the electronic device 10;

Receiving 211 by the electronic device 10 at least a first audio and/or video data stream from the audio capture module 11 and/or the video capture module 12, respectively;

Sending 212 from the electronic device 10 the first audio and/or video data stream to the computer platform 40b;

Receiving by the computer platform 40b the first audio and/or video data stream from the electronic device 10;

Sending from the user terminal 50 at least a second audio and/or video data stream to the computer portal 40a;

Receiving by the computer portal 40a the second audio and/or video data stream;

Sending 213 by the computer platform 40b the first audio and/or video data stream to the computer portal 40a and sending by the computer portal 40a the second audio and/or video data stream to the computer platform 40b;

Receiving by the computer portal 40a the first audio and/or video data stream from the computer platform 40b and receiving by the computer platform 40b the second audio and/or video data stream from the computer portal 40a;

Sending from the computer portal 40a the first audio and/or video data stream to the user terminal 50 and sending 214 from the computer platform 40b the second audio and/or video data stream to the electronic device 10;

Receiving by the user terminal 50 the first audio and/or video data stream from the computer portal 40a and displaying on the user terminal 50 the first audio and/or video data stream;

Receiving by the electronic device 10 the second audio and/or video data stream from the computer platform 40b;

Sending 215 by the electronic device 10 the second audio and/or video data stream to the display device 30, and preferably sending from the electronic device 10 an instruction to display the second audio and/or video data stream to the display device 30;

Then displaying on the display device 30 the second audio and/or video data stream;

Then emitting and receiving by the computer platform 40b a plurality of audio and/or video data streams from and to the computer portal 40a and from and to the electronic device 10 so as to allow an audio and/or video communication, preferably in real time, between a user of the user terminal 50 and the resident 60.

When the user wishes to end the communication, the user actuates his user terminal 50 and the latter sends 216 at least one interrupt instruction to the computer portal;

Receiving by the computer portal 40a the interrupt instruction from the user terminal 50;

Sending 217 by the computer portal 40a the interrupt instruction to the computer server 40;

Receiving by the computer server 40 the interrupt instruction from the computer portal 40a;

Sending by the computer server 40 at least one interrupt notification to the electronic device 10;

Receiving 218 by the electronic device 10 the interrupt notification from the computer server 40, and sending 219 from the electronic device 10 to the display device 30 an instruction to switch from the second video source to the first source video;

Sending 220 from the computer server 40 at least one instruction to close the communication channel to the computer platform 40b;

Receiving by the computer platform 40b the instruction to close the communication channel from the computer server 40;

Closing by the computer platform 40b the communication channel;

Sending 221 from the computer platform 40b at least one interrupt confirmation to the computer portal 40a;

Receiving by the computer portal 40a the interrupt confirmation from the computer platform 40b;

Sending the interrupt confirmation from the computer portal 40a to the user terminal 50;

Receiving by the user terminal 50 the interrupt confirmation from the computer portal 40a.

Thus, the present invention allows to establish audio and/or video communication between a resident and his relatives, in a simple and reliable manner. The resident only has to activate his control device. From there, communication is established and when it ends, the resident's television automatically switches to the video source used, for example before the communication.

Although one or more preferred embodiments of the invention are described in the present description, it should be understood that the invention is not limited to this or these embodiments, and that variations can be made to within the scope of the following claims.

REFERENCES

10. Electronic device
11. Audio capture module
11a. Connection between the electronic device and the audio capture module
12. Video capture module
12a. Connection between the electronic device and the video capture module
20. Control device
20a. First control device
20b. Second control device
20c. Third control device
21. Wireless communication
30. Display device
31. Electrical communication
32. Infrared communication
40. Computer server
41. Computer communication between the electronic device and the computer server
40a. Computer portal
40b. Computer platform
50. User terminal
51. Computer communication between the user terminal and the computer server
60. Resident
102. Sending from the computer portal the first communication datum to the computer server 103. Receiving by the electronic device the first communication datum from the computer server
104. Receiving by the electronic device a notification of a new communication datum from the computer server
105. Sending by the computer server a notification of reception of a new communication datum to the computer portal
106. Sending by the electronic device a notification to the control device
107. Actuating the single control button of the control device by the resident, then sending at least one control datum by the control device to the electronic device
108. Receiving by the electronic device a control datum from the control device
109. Sending from the electronic device the first communication datum to the display device and sending at least one instruction to switch from a first video source to a second video source to the display device, and preferably sending from the electronic device at least one instruction to display the communication datum to the display device
201. Sending from a user terminal at least one connection request to the computer portal
202. Sending from the computer portal the communication request to a computer platform
203. Creating at the computer platform at least one communication channel
204. Sending from the computer platform the connection request to the computer server
205. Receiving by the electronic device the connection request from the computer server
206. Sending by the electronic device at least one instruction to switch from a first video source to a second video source to the display device
207. Sending a notification from the electronic device to the control device
208. Actuating the single control button of the control device by the resident, then sending at least one control datum by the control device to the electronic device
209. Receiving by the electronic device a control datum from the control device
210. Sending from the electronic device an instruction to activate the audio capture module and/or the video capture module respectively to the audio capture module and/or the video capture module
211. Receiving by the electronic device at least a first audio and/or video data stream respectively from the audio capture module and/or from the video capture module
212. Sending from the electronic device the first audio and/or video data stream to the computer platform
213. Sending from the computer platform the first audio and/or video data stream to the computer portal and sending from the computer portal a second audio and/or video data stream to the computer platform
214. Sending from the computer platform the second audio and/or video data stream to the electronic device and sending from the electronic device the first audio and/or video data stream to the computer platform
215. Sending from the electronic device the second audio and/or video data stream to the display device, and preferably sending from the electronic device an instruction to display the second audio and/or video data stream to the display device
216. Sending from the user terminal an interrupt instruction to the computer portal
217. Sending from the computer portal the interrupt instruction to the computer server
218. Receiving by the electronic device an interrupt notification from the computer server
219. Sending from the electronic device a control instruction to switch from the second video source to the first video source to the display device
220. Sending from the computer server an instruction to close the communication channel to the computer platform
221. Sending from the computer platform an interrupt confirmation to the computer portal

The invention claimed is:

1. A method for displaying at least one communication datum on at least one display device, disposed in a living space of at least one resident, said communication datum being taken from at least: a text, an image, an audio and/or video data stream, an audio and/or video call request, an audio and/or video recording, said display method comprising at least the following steps:
Receiving by an electronic device, located in said living space, at least a first communication datum from at least one computer server in communication with the electronic device through at least one communication network;
Sending by the electronic device at least one first notification of a new communication to at least one control device comprising a single control button;
Receiving said first notification by said control device;
Then, generating by said control device at least one second notification of a new communication intended for said resident, said second notification being taken from at least: a visual notification, an auditory notification, a tactile notification;
In response to said second notification, actuating the single control button of the control device by at least one finger of the resident, and
in response to said actuation, sending by the control device a control datum, configured to establish a communication, to the electronic device through a wireless communication;
Receiving by the electronic device said control datum from the control device;
Sending from the electronic device the first communication datum to the display device;
Displaying by said display device said first communication datum.

2. The method according to claim 1 comprising, before and/or after receiving the control datum by the electronic device from the control device, at least one step of sending from the electronic device to the display device at least one instruction to switch from a first video source to a second video source.

3. The method according to claim 1 comprising, before and/or after the step of sending the first notification, by the electronic device, to the control device, at least one step of storing the first communication datum in at least one non-transitory storage module of said electronic device.

4. The method according to claim 1 comprising, after the step of receiving by the electronic device the control datum from said control device, at least the following steps:
Sending by said electronic device to at least one computer server at least a first audio and/or video data stream;
Receiving by the electronic device at least a second audio and/or video data stream from a computer server, the second audio and/or video data stream coming from at least one user terminal.

5. The method according to claim 4 comprising, before the step of sending at least a first audio and/or video data stream by said electronic device to at least one computer server, at least the following steps:
- Sending from the electronic device at least one instruction to activate at least one capture module to at least one capture module, the capture module being taken from at least one audio capture module and/or one video capture module;
- Receiving by the capture module the activation instruction from the electronic device;
- Activating the capture module;
- Sending by the capture module the first audio and/or video data stream to the electronic device;
- Receiving by the electronic device the first audio and/or video data stream from the capture module.

6. The method according to claim 1 comprising, before the step of receiving by the electronic device at least a first communication datum from at least one computer server, the following steps:
- Actuating said single control button by at least one finger of said resident;
- In response to said actuation, sending by said control device a preliminary control datum, configured to establish a communication, to the electronic device;
- Receiving by said electronic device at least one preliminary control datum from said control device;
- Sending by the electronic device at least one preliminary communication datum to at least one computer server;
- Receiving by the computer server said preliminary communication datum from the electronic device;
- Sending by the computer server said preliminary communication datum to at least one user terminal.

7. The method according to claim 6, wherein the preliminary communication datum comprises an audio and/or video call request.

8. The method according to claim 1 comprising, before and/or after sending from the electronic device the first communication datum to the display device, at least one step of sending from the electronic device at least one instruction to display the communication datum to the display device.

9. The method according to claim 8 wherein sending from the electronic device at least one instruction to display the communication datum to the display device is carried out through at least one optical connection between the electronic device and the display device.

10. A system for displaying at least one communication datum on at least one television set configured to display said communication datum and being disposed in a living space of at least one resident comprising at least:
- An electronic device being configured for:
- receiving at least said communication datum from at least one computer server,
- sending at least said communication datum to said display device;
- sending at least one first notification of a new communication to at least one control device;
- receiving at least one control datum, configured to establish a communication, from at least one control device;
- Said control device comprising a single control button and being configured for:
- receiving at least said notification from said electronic device;
- generating at least one second notification of a new communication taken from at least: a visual notification, an auditory notification, a tactile notification;
- emitting said control datum to said electronic device by a wireless communication by actuating said control button by at least one finger of a resident.

11. The system according to claim 10 wherein the single control button is a push button and/or a touch sensor.

12. The system according to claim 10 wherein the control device is configured to be worn by the resident, badge or bracelet.

13. The system according to claim 10 wherein the control device is shaped to fit in the hand of a resident.

14. The system according to claim 10 wherein the control device comprises an electrical power source.

15. The system according to claim 10 wherein the electronic device controls the display device by an electrical connection.

16. The system according to claim 10, wherein the electronic device controls the display device by an optical connection.

17. The system according to claim 16, wherein the display device comprises at least one audio and/or video input configured to receive at least one audio and/or video data stream and at least one optical communication port, configured to receive at least one instruction from at least one remote control different from the electronic device and from the control device, the electronic device being configured to control the display device by sending at least one optical signal comprising at least one instruction to said optical communication port.

18. The system according to claim 10 comprising a plurality of control devices distinct from each other, physically separate and configured to emit single control data, configured to establish a communication, different from each other to the electronic device.

19. The system according to claim 10 wherein the electronic device is intended to be in communication with at least one audio capture module and/or one video capture module.

20. The system according to claim 10, wherein the electronic device comprises at least one processor, at least one non-transitory memory storing a computer program product including instructions that can be executed by said at least one processor, said instructions being configured to at least partly execute the method according to claim 1.

* * * * *